SEALER COMPOSITION OF A METHACRYLATE COPOLYMER, AN EPOXY RESIN, POLYMETHYL METHACRYLATE AND AN ORGANIC PLASTICIZER

Roger A. Hiss, Troy, Mich., assignor to E. I. du Pont de Nemours and Company, Wilmington, Del.
No Drawing. Filed Feb. 1, 1973, Ser. No. 328,850
Int. Cl. C08g 51/38
U.S. Cl. 260—31.8 M          8 Claims

ABSTRACT OF THE DISCLOSURE

The sealer composition contains a binder of a methacrylate copolymer of methyl methacrylate and a hydroxy aminopropyl acrylate or a hydroxy aminopropyl methacrylate, an epoxy hydroxy polyether resin,
polymethyl methacrylate and
an organic plasticizer;

the sealer composition is primarily used over primed metal substrates to provide a surface to which acrylic lacquer or acrylic dispersion lacquer coatings can be applied and provides a finish for automobiles and trucks which has excellent intercoat adhesion, excellent chip resistance and resistance to deterioration from exposure to water and high humidity.

BACKGROUND OF THE INVENTION

This invention is related to a sealer composition and in particular to a sealer composition of an acrylic polymer and an epoxy resin.

Sealer compositions are well known in the automobile and truck manufacturing industry and are applied over the primed steel substrate and form a smooth, even surface over which an acrylic lacquer, an acrylic dispersion, or an acrylic enamel topcoat is applied. Typical sealer compositions are shown in Swanson and Walus U.S. Pat. 3,272,647, issued September 13, 1966; Jeffery et al. U.S. 3,505,269, issued Apr. 7, 1970; Rohrbacher U.S. 3,509,086, issued Apr. 28, 1970 and Sandstedt U.S. 3,627,779, issued Dec. 14, 1971. These sealer compositions are of a high quality and are excellent for many purposes, however, there is a great need today in the automobile manufacturing industry for a low cost sealer composition that has outstanding chip and corrosion resistance, that has an exceptional high level of adhesion to the primer coating including electrodeposited primer coatings, and that provides a smooth surface to which the aforementioned acrylic topcoats will readily adhere. The novel sealer composition of this invention has these outstanding characteristics.

SUMMARY OF THE INVENTION

The sealer composition of this invention comprises 2–30% by weight of a binder that is dissolved in 70–98% by weight of an organic solvent for the binder and optionally contains pigment in a pigment to binder ratio of about 5:100 to 150:100; wherein the binder consists essentially of (A) 30–45% by weight, based on the weight of the binder, of a methacrylate compolymer of 90–99% by weight, based on the weight of the copolymer, of methyl methacrylate and correspondingly 1–10% by weight, based on the weight of the copolymer, of a hydroxy aminopropyl acrylate or a hydroxy amino methacrylate; and the copolymer has an inherent viscosity of about 0.25 to 0.35 measured at 0.5% polymer solids in ethylene dichloride solvent at 25° C.;

(B) 25–45% by weight, based on the weight of the binder, of an epoxy resin of the formula

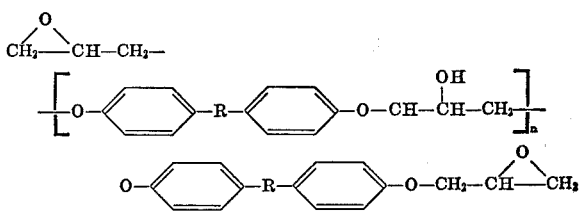

wherein R is an alkyl group having 1–4 carbon atoms and $n$ is a positive integer sufficiently large to provide a weight average molecular weight of about 15,000–200,000;

(C) 5–20% by weight, based on the weight of the binder, of polymethyl methacrylate having a relative viscosity of 0.25 to 0.45 measured as indicated above; and (D) 5–25% by weight, based on the weight of the binder, of an organic plasticizer.

DESCRIPTION OF THE INVENTION

The sealer composition of the invention has a polymeric binder content of about 2–30% by weight, and preferably, a binder content of about 5–25% by weight. The composition can contain pigment in a pigment to binder ratio of about 5:100 to 150:100.

The polymeric binder of the sealer composition preferably comprises about 37–43% by weight of the methacrylate copolymer, about 27–33% by weight of the epoxy resin, about 9–15% by weight of polymethyl methacrylate and 15–21% by weight of the organic plasticizer.

The methacrylate copolymer and the methyl methacrylate polymer are prepared by conventional solution or bulk polymerization techniques in which the monomers, polymerization catalyst and solvents are charged into a polymerization vessel and heated to form a polymer of the desired molecular weight as indicated by the viscosity of the polymer.

One preferred method for preparing the methacrylate copolymer is disclosed in Blake U.S. Pat. 2,949,445, issued Aug. 16, 1960, in which methyl methacrylate is polymerized with glycidyl methacrylate and the resulting product is then reacted with ammonia or an amine to provide a polymer having the radical

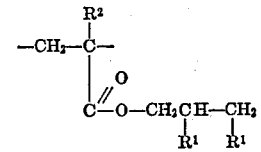

where one $R^1$ is a hydroxyl group and the second $R^1$ is an amino residue from ammonia or monoamines and $R^2$ is H or $CH_3$.

The sealer composition of this invention preferably utilizes a methacrylate copolymer of 97–99% by weight of methyl methacrylate and 1–3% by weight of hydroxy aminopropyl methacrylate and has an inherent viscosity of about 0.28–0.33 measured at 0.5% polymer solids in ethylene dichloride solvent at 25° C. One preferred methacrylate copolymer comprises 98% methyl methacrylate and 2% hydroxy aminopropyl methacrylate and has an inherent viscosity of about 0.3 measured as above.

The methyl methacrylate polymer used in this invention has an inherent viscosity of about 0.25–0.45 measured at 0.5% polymer solids in ethylene dichloride solvent at 25° C. and preferably has an inherent viscosity of 0.31–0.36.

The epoxy resin used in the novel sealer composition of this invention is of the formula

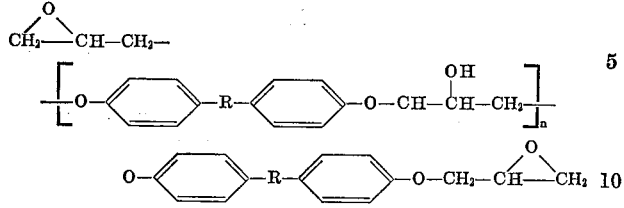

wherein R is an alkyl group having 1–4 carbon atoms and n is a positive integer sufficiently large to provide a weight average molecular weight of about 15,000–200,000.

Preferably, the epoxy resin utilized in the novel sealer composition of this invention is the reaction product of epichlorohydrin and bis-phenol A which is para, para'-isopropylidene diphenol, which provides a resin in which R is $$\begin{array}{c} CH_3 \\ | \\ C \\ | \\ CH_3 \end{array}.$$

This epoxy resin has a weight average molecular weight of about 15,000–45,000 and preferably a weight average molecular weight of about 25,000–35,000. To obtain a sealer composition that has good physical properties and in particular, excellent adhesion characteristics, the epoxide content of the epoxy resin is about 0.4–0.7% by weight, based on the weight of epoxy resin, and preferably, about 0.5% by weight. The molecular weight distribution of the epoxy resin is 2.1 to 2.5 and preferably, 2.3–2.4.

The molecular weight distribution is characterized by $$\frac{\overline{M}_w}{\overline{M}_n}$$

where $\overline{M}_w$ is the weight average molecular weight and $\overline{M}_n$ is the number average molecular weight. The weight average molecular weight of the epoxy resin is determined by gel permeation chromatography using polystyrene as the standard. Other methods for determining $\overline{M}_w$ and methods for determining $\overline{M}_n$ are described in "Textbook of Polymer Science" by F. W. Billmeyer, Jr., 1962.

An epoxy resin prepared from epichlorohydrin and bis-phenol F can also be used which provides a resin in which R is $CH_2$.

The organic plasticizers used in the novel sealer composition of this invention preferably are phthalate esters such as butyl benzyl phthalate, dibutyl phthalate, 2-ethylhexyl phthalate, dicyclohexyl phthalate, dibenzyl phthalate, butyl cyclohexyl phthalate, dimethyl cyclohexyl phthalate and the like. Butyl benzyl phthalate is the preferred plasticizer.

Other organic plasticizers can be used such as epoxidized soya bean oil, oil free and oil modified alkyds and polyesters. Typical polyesters are polyorthophthalate esters, polyalkylene adipate esters, polyarylene adipate esters, mixed benzoic acid and fatty acid esters of pentaerythritol, poly(propylene adipate) dibenzoate ester, diethylene glycol dibenzoate, tetrabutylthiodisuccinate, butyl phthalyl glycoate, acetyl tributyl citrate, dibenzyl sebacate, toluene ethyl sulfonamide and the like.

Any of the conventional solvents or blends of solvents can be used to form the novel sealer composition of this invention provided that the selection of solvents is such that the polymeric constituents are compatible and give a high quality sealer. The following are examples of solvents which can be used to prepare the sealer composition: methylethyl ketone, toluene, acetone, isopropanol, ethylene glycol monoethyl ether acetate, and other esters, ethers, ketones and aliphatic, cycloaliphatic and aromatic hydrocarbon solvents. One preferred blend of solvents comprises 9–12% acetone, 11–13% methylethyl ketone, 31–33% toluene, 19–22% isopropanol, 13–15% ethylene glycol monoethyl ether and 10–12% ethylene glycol monoethyl ether acetate (all percentages are by volume).

A variety of pigments, organic dyes and lakes can be utilized in the novel sealer composition of this invention. Examples of the useful pigments are: metallic oxides, such as titanium dioxide, iron oxide, zinc oxide and the like; metal hydroxides, metal flakes, such as aluminum flake, metal powders, chromates, sulfides, sulfates, carbonates, carbon black, talc, china clay, iron blues, lead blues, organic reds and organic maroons and the like. One particularly preferred combination of pigments which provides a high quality sealer composition is a mixture of titanium dioxide, carbon black and aluminum silicate.

The novel sealer composition of this invention can be applied over a variety of pigmented primer coatings, such as alkyd primer coatings, alkyd/epoxy primer coatings, acrylic primer coatings, acrylic/epoxy primer coatings and the like. These primer coatings can be applied to the steel substrate by conventional techniques, such as spraying, electrostatic spraying, dipping, brushing, flowcoating, electrocoating and the like and are about 0.5–3 mils in thickness. Powder coating primers can also be utilized. The novel sealer composition of this invention is applied over the primed substrate by any of the conventional application methods, such as spraying, electrostatic spraying, dipping, brushing, flowcoating, and the like. The sealer coated substrate is then baked from about 125–175° C. for about 5–60 minutes. Generally, the thickness of the dried sealer coat is 0.1–1.0 mils, and preferably, about 0.1–0.5 mil. An acrylic solution lacquer or an acrylic dispersion lacquer is then applied to the sealed surface and baked to provide a topcoating about 0.5–3.0 mils thick.

Another method that can be utilized, is to apply the sealer coating on the primed substrate and allow the sealer coating to completely dry or dry to a tack-free state and apply an acrylic lacquer of an acrylic dispersion lacquer topcoating to the sealer. This coated substrate is then pre-baked for about 10 minutes at about 100° C. and then baked for 30 minutes at about 155° C. This technique provides an excellent finish.

The novel sealer composition of this invention provides a smooth and even surface and when a topcoat is applied, the resulting finish has an excellent appearance, good gloss, good crack and chip resistance and good corrosion resistance. The sealer has the necessary balance of cost and good physical properties which make the sealer acceptable to the automotive and truck manufacturing industries.

The following Examples illustrate the invention.

Example 1

A mill base is prepared as follows:

| | Parts by weight |
|---|---|
| Portion 1: | |
| Ethylene glycol monoethyl ether | 53.69 |
| Toluene | 161.06 |
| Methacrylate copolymer solution (30% polymer solids of a methyl methacrylate/hydroxy aminopropyl methacrylate copolymer [1] in a weight ratio of 98/2 in a solvent mixture of toluene/isopropanol in a ratio of 8.7/6.9) | 214.87 |
| Portion 2: | |
| Bentone 34 pigment (aluminum silicate pigment) | 10.74 |
| Carbon black pigment | 42.95 |
| Portion 3: | |
| Titanium dioxide pigment | 375.82 |
| Portion 4: | |
| Methacrylate copolymer (solution described above) | 214.87 |
| Total | 1074.00 |

[1] Methacrylate Copolymer—having an inherent viscosity of about 0.3, measured at 0.5% solids in ethylene dichloride solvent at 25° C.

The ingredients of Portion 1 are charged in the order shown into a mixing vessel and mixed for 15 minutes. Portion 2 is added and mixed for 15 minutes. Portion 3 is then added and mixed for 30 minutes, then Portion 4 is added and mixed for 30 minutes. The resulting mixture is then charged into a standard 8 gallon sand-mill and ground one pass at a rate of 8–10 gallons per hour. The resulting mill base has a solids content of about 52% and a pigment to binder ratio of 333:100.

A sealer composition is prepared as follows:

Portion 1: Parts by weight
Acetone _____ 49.12
Toluene _____ 80.77
Isopropanol _____ 48.97
Ethylene glycol monoethyl ether _____ 86.73
Ethylene glycol monoethyl ether acetate ___ 74.06
Butyl benzyl phthalate _____ 27.65

Portion 2:
Epoxy resin solution (40% polymer solids in methylethyl ketone of a polymer of the formula

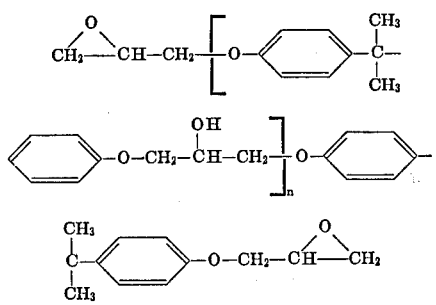

where n is a positive integer to provide a weight average molecular weight of about 30,000 measured by gel permeation chromatography, a number average molecular weight of about 12,800 and a molecular weight distribution of about 2.34 and an epoxide content of about 0.5% by weight) _____ 115.22

Portion 3:
Polymethyl methacrylate solution (40% polymer solids in a solvent blend of toluene/acetone, weight ratio 2.5/1.1 in which the polymer has an inherent viscosity of about 0.33 measured at 0.5% solids in ethylene dichloride solvent at 25° C.) _____ 46.09

Portion 4:
Methacrylate copolymer solution (described above) _____ 173.61

Portion 5:
Mill base (prepared above) _____ 78.78

Total _____ 781.00

The ingredients of Portion 1 are added in the order shown to a mixing vessel with constant mixing. Portion 2 is added and mixed for 15 minutes. Portion 3 is added and mixed for 15 minutes. Portion 4 is added and mixed for 15 minutes and then Portion 5 is added and mixed for 45 minutes. The resulting sealer has a solids content of 23.7%, a pigment to binder ratio of about 20.5:100 and the ratio of acrylic resin/epoxy resin/plasticizer is 52/30/18.

The sealer composition is the reduced 150% with a standard solution acrylic lacquer thinner, to a spray viscosity. The sealer composition is then sprayed onto the following primed steel panel: a phosphatized steel panel primed with a carbon black pigmented alkyd resin. After the sealer is sprayed onto the above steel panel, each of the panels is baked at 195° C. for about 30 minutes.

The resulting sealer coating on each of the substrates is about 0.10–0.50 mil in thickness.

A standard acrylic lacquer of polymethyl methacrylate and a copolymer of methyl methacrylate is applied and baked for about 30 minutes at 150° C. To the second set of panels, an acrylic dispersion lacquer is applied and baked at 150° C. for about 30 minutes. The resulting finishes are then tested as above for chip resistance, adhesion of the topcoat to the sealer coat and for corrosion resistance. Each of the panels has excellent chip resistance, illustrates good adhesion of the topcoat to the sealer coat and has excellent corrosion resistance.

Example 2

A mill base is prepared as follows:

Portion 1: Parts by weight
Ethylene glycol monoethyl ether _____ 5
Toluene _____ 15
Methacrylate copolymer solution (described in Example 1) _____ 20

Portion 2:
Bentone 34 pigment (aluminum silicate pigment) _____ 1
Carbon black pigment _____ 4

Portion 3:
Titanium dioxide pigment _____ 35

Portion 4:
Methacrylate copolymer solution (described in Example 1) _____ 20

Total _____ 100

Portion 1 is charged into a mixing vessel and mixed for 5 minutes. Portion 2 is added and mixed for 15 minutes. Portion 3 is added and mixed for 30 minutes and Portion 4 is added and mixed for 30 minutes. The mixture is then charged into a standard sand-mill and ground two passes to give a uniform pigment dispersion.

A sealer composition is then prepared as follows:

Portion 1: Parts by weight
Ethylene glycol monoethyl ether _____ 23.18
Isopropanol _____ 6.28
Toluene _____ 7.33
Methylethyl ketone _____ 6.80
Xylene _____ 9.79
Butylbenzyl phthalate _____ 2.92

Portion 2:
Polymethyl methacrylate solution (described in Example 1) _____ 4.87

Portion 3:
Methacrylate copolymer solution (described in Example 1) _____ 18.32

Portion 4:
Epoxy resin solution (described in Example 1) _____ 12.18

Portion 5:
Mill base (prepared above) _____ 8.33

Total _____ 100.00

Portion 1 is charged into a mixing vessel and mixed. Portion 2 is added and mixed for 15 minutes. Portion 3 is added and mixed for 15 minutes. Portion 4 is added and mixed for 15 minutes and then Portion 5 is added and mixed for 45 minutes. The resulting sealer has a solids content of about 23%, a pigment to binder ratio of about 20.5:100.

The sealer is then reduced to a spray viscosity as in Example 1 and applied to the primed steel panels described in Example 1 and baked under the same conditions as described in Example 1. A standard acrylic topcoat lacquer is applied and baked for 30 minutes at 150° C. The finish on the panels has excellent chip resistance, good adhesion of the topcoat to the sealer coat and excellent corrosion resistance.

The invention claimed is:
1. A sealer composition comprising 2-3% by weight of a binder dissolved in 70-98% by weight of an organic solvent for the binder; wherein the binder consists essentially of
   (A) 30-45% by weight, based on the weight of the binder, of a methacrylate copolymer consisting essentially of
      90-99% by weight, based on the weight of the copolymer, of methyl methacrylate and correspondingly 1-10% by weight, based on the weight of the copolymer, of a hydroxy aminopropyl acrylate or a hydroxy aminopropyl methacrylate; and the copolymer having an inherent viscosity of about 0.25 to 0.35 at 0.5% polymer solids measured in ethylene dichloride solvent at 25° C.;
   (B) 25-45% by weight, based on the weight of the binder, of an epoxy resin of the formula

$$CH_2\!\!-\!\!\!\overset{O}{\diagdown}\!\!CH\!\!-\!\!CH_2\!-\!\!\left[O\!-\!\!\bigcirc\!\!-\!\!\overset{CH_3}{\underset{CH_3}{C}}\!\!-\!\!\bigcirc\!\!-\!\!O\!-\!\!CH_2\!-\!\!\overset{OH}{\underset{}{CH}}\!\!-\!\!CH_2\right]_n$$
$$O\!-\!\!\bigcirc\!\!-\!\!\overset{CH_3}{\underset{CH_3}{C}}\!\!-\!\!\bigcirc\!\!-\!\!O\!-\!\!CH_2\!-\!\!CH\!\!-\!\!\!\overset{O}{\diagdown}\!\!CH_2$$

$n$ is a positive integer sufficiently large to provide a weight average molecular weight of about 15,000-45,000;
   (C) 5-20% by weight, based on the weight of the binder, of polymethyl methacrylate having a relative viscosity of 0.25 to 0.45 measured at 0.5% polymer solids in ethylene dichloride solvent at 25° C.; and
   (D) 5-25% by weight, based on the weight of the binder, of an organic plasticizer selected from the group consisting of butyl benzyl phthalate, dibutyl phthalate, 2-ethylhexyl phthalate, dicyclohexyl phthalate, dibenzyl phthalate, butyl cyclohexyl phthalate and dimethyl cyclohexyl phthalate.

2. The sealer composition of Claim 1 containing pigment in a pigment to binder ratio of about 5:10 to 150:100.

3. The sealer composition of Claim 2 in which the binder consists essentially of
   (A) 37-43% by weight, based on the weight of the binder, of the methacrylate copolymer;
   (B) 27-33% by weight, based on the weight of the binder, of the epoxy resin;
   (C) 9-15% by weight, based on the weight of the binder, of polymethyl methacrylate, and
   (D) 15-21% by weight, based on the weight of the binder of an organic plasticizer.

4. The sealer composition of Claim 3 in which the pigment consists essentially of a blend of titanium dioxide pigment, carbon black pigment and aluminum silicate pigment.

5. The sealer composition of Claim 4 in which the methacrylate copolymer consists essentially of 97-99% by weight of methyl methacrylate and 1-3% by weight of hydroxyl aminopropyl methacrylate and has an inherent viscosity of about 0.28-0.33.

6. The sealer composition of Claim 5 in which the R group of the epoxy resin has the formula $$\begin{array}{c}CH_3\\|\\C\\|\\CH_3\end{array}$$

and the epoxy resin has a weight average molecular weight of about 25,000-35,000 and has an epoxide content of about 0.4-0.7% by weight.

7. The sealer composition of Claim 6 in which the organic plasticizer is butylbenzyl phthalate.

8. The sealer composition of Claim 2 in which the binder consists essentially of
   (A) 37-43% by weight, based on the weight of the binder, of a copolymer of 98% by weight methyl methacrylate and 2% by weight of hydroxy aminopropyl methacrylate and having an inherent viscosity of about 0.3;
   (B) 27-33% by weight, based on the weight of the binder, of an epoxy resin of the formula $$CH_2\!\!-\!\!\!\overset{O}{\diagdown}\!\!CH\!\!-\!\!CH_2\!-\!\!\left[O\!-\!\!\bigcirc\!\!-\!\!\overset{CH_3}{\underset{CH_3}{C}}\!\!-\!\!\bigcirc\!\!-\!\!O\!-\!\!CH_2\!-\!\!\overset{OH}{\underset{}{CH}}\!\!-\!\!CH_2\right]_n$$
$$O\!-\!\!\bigcirc\!\!-\!\!\overset{CH_3}{\underset{CH_3}{C}}\!\!-\!\!\bigcirc\!\!-\!\!O\!-\!\!CH_2\!-\!\!CH\!\!-\!\!\!\overset{O}{\diagdown}\!\!CH_2$$

where $n$ is a positive integer to provide a weight average molecular weight of about 25,000-35,000 and the epoxy resin has a 0.4-0.7% by weight epoxide content;
   (C) 9-15% by weight, based on the weight of the binder, of polymethyl methacrylate having an inherent viscosity of about 0.31-0.36;
   (D) 15-21% by weight, based on the weight of the binder, of butylbenzyl phthalate, and wherein the pigment consists essentially of a blend of titanium dioxide, carbon black and aluminum silicate.

References Cited
UNITED STATES PATENTS 3,509,086  4/1970  Rohrbacher, Jr. ____ 260—837 R
3,058,951  10/1962  Flowers et al. ____ 260—837 R MORRIS LIEBMAN, Primary Examiner E. SUZANNE PARR, Assistant Examiner U.S. Cl. X.R.
260—837 R

PO-1050
(5/69)

UNITED STATES PATENT OFFICE
CERTIFICATE OF CORRECTION

Patent No. 3,845,002    Dated October 29, 1974

Inventor(s) Roger A. Hiss

It is certified that error appears in the above-identified patent and that said Letters Patent are hereby corrected as shown below:

Claim 1, column 7, line 2, "2-3%" should read -- 2-30% --;

Claim 2, column 7, line 45, "5:10" should read -- 5:100 --;

Claim 5, column 8, line 4, "hydroxyl" should read -- hydroxy --.

Claim 8, column 8, line 30, "O " should read -- O- --.

Signed and sealed this 15th day of April 1975.

(SEAL)
Attest:

RUTH C. MASON
Attesting Officer

C. MARSHALL DANN
Commissioner of Patents
and Trademarks